July 12, 1960     H. CROUZET     2,944,319
HEATING DEVICE FOR FILAMENTS
Filed April 7, 1959
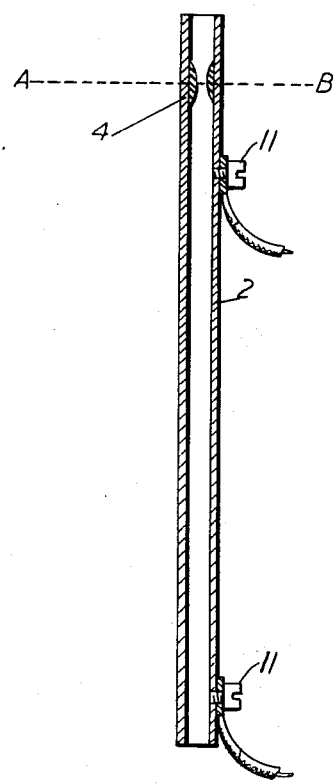
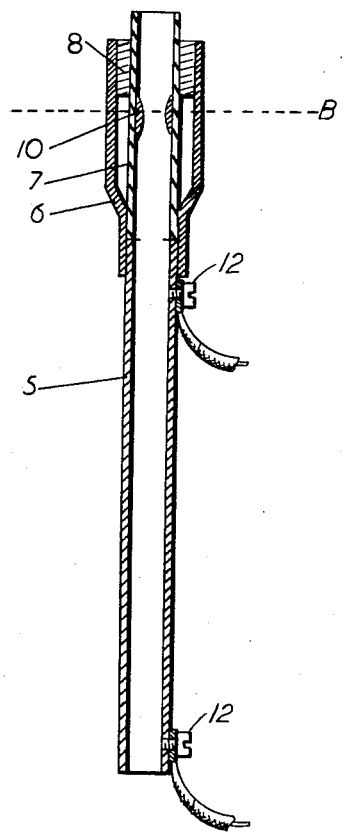
Inventor
Henri Crouzet
By
Attorney United States Patent Office 2,944,319
Patented July 12, 1960

1

2,944,319
HEATING DEVICE FOR FILAMENTS

Henri Crouzet, Roanne, France, assignor to Moulinage et Retorderie de Chavanoz, Chavanoz (Isere), France, a corporation of France Filed Apr. 7, 1959, Ser. No. 804,764

Claims priority, application France Apr. 8, 1958

1 Claim. (Cl. 28—62)

This invention relates to a heating device for treating synthetic filaments.

When synthetic filaments are subjected to high-temperature heat treatment, vapors are generally evolved which usually condense near the top of the heating element at a point where the temperature begins to drop off. This condensation gives rise to a solid deposit which must be removed from time to time.

With a view to overcoming this drawback, the invention provides a heating element designed for the treatment of textile filaments, and specifically of superpolyamide filaments, which consists of a two-part tubular element. The part located on the side where the filament enters is permanently attached to the machine and constitutes the heating element as such; whereas the part on the side where the filament leaves, located in the temperature region where the vapors condense, is removably mounted.

In one embodiment of the invention, this heating element consists of a first tube which in the temperature zone where vapor condensation occurs carries a hopper-shaped tubular element which is permanently secured thereto and into which is removably set a short tube which forms an extension of the first tube and in which the condensation takes place.

It should be noted that the heating means of this element may be of any kind.

The invention will be more readily understood with the aid of the appended diagrammatic drawing which shows, by way of example, an embodiment of said heating element.

In the drawing:

Fig. 1 is a longitudinal section of a heating element of the conventional type; and Fig. 2 is a similar view of a heating element embodying the invention.

Referring first to Fig. 1, a heating element of the conventional type consists of a tube 2 fitted with terminals 11 permitting it to be connected to an electrical circuit for heating purposes.

2

In the unheated upper part of the tube 2, that is, in the region where the temperature begins to fall off, solid deposits 4 form, caused by condensation of the vapors which are evolved in the course of the heat treatment of the filament passing through the tube.

Fig. 2 shows a heating element embodying the invention. Said element consists of a lower tube 5 carrying at its upper end a conical sleeve 6 into which there is removably set a short tube 7 thta forms an extension of tube 5 and is held in place in the upper part of said conical sleeve by an insulating ring 8. Terminals 12 located on the lower part of tube 5 and also near the upper conical sleeve 6 permit the heating element to be connected to a source of heating current.

As may be seen from Fig. 2, the deposits due to condensation of the vapors that are evolved during the heat-treatment of the filament which passes through the heating element will form in the upper tube 7 on the level of line A—A, in the region where the temperature drops.

In view of the ease with which tube 7 can be removed, it is evident that the downtime of the machine for the removal of deposits 10 caused by condensation is reduced to a minimum. Actually, all that need be done is to remove tube 7 of each element and replace it with an identical tube free of deposits, which only takes a moment. The cleaning of the encrusted tube 7 is then done outside of the machine, in a caustic soda bath, for example.

Obviously, the invention is not limited to the embodiment which has been given merely as an illustration. Various changes and modifications will be apparent to a person skilled in the art.

What is claimed is:

Apparatus for the treatment of textile filaments comprising a fixed tube having a substantially vertical axis, means heating said tube to a temperature suited for the treatment of said filaments, a sleeve disposed at the upper end of said tube and a second tube removably mounted in said sleeve in axial alignment with said first tube, said sleeve having heat-insulating means to retard the transfer of heat from said first tube to said second tube whereby condensation of vapors rising from said first tube may take place on the walls of said second tube, and means feeding a textile filament for treatment upwardly through said tubes.

References Cited in the file of this patent

UNITED STATES PATENTS

| | | |
|---|---|---|
| 1,485,254 | Dickie | Feb. 26, 1924 |
| 2,005,580 | Ferre | June 18, 1935 |
| 2,823,292 | Kunzle | Feb. 11, 1958 |